United States Patent [19]

Muehlhausen

[11] Patent Number: 5,084,756
[45] Date of Patent: Jan. 28, 1992

[54] APPARATUS OPERABLE AS A VIEWER OR IMAGE SCANNER

[75] Inventor: Robert A. Muehlhausen, May Township, County of Washington, Minn.

[73] Assignee: Minnesota Mining and Manufacturing Company, St. Paul, Minn.

[21] Appl. No.: 569,587

[22] Filed: Aug. 20, 1990

Related U.S. Application Data

[63] Continuation of Ser. No. 202,371, Jun. 6, 1988, abandoned.

[51] Int. Cl.$^5$ .................. H04N 3/36; H04N 5/253; H04N 3/40; H04N 12/28; G03B 13/28
[52] U.S. Cl. ................................ 358/214; 358/215; 355/45
[58] Field of Search ............. 358/214, 215, 60; 365/127; 355/45; 353/66, 82, 122

[56] References Cited

U.S. PATENT DOCUMENTS

| | | | |
|---|---|---|---|
| 3,832,528 | 8/1974 | Abe | 365/127 |
| 3,838,402 | 10/1974 | Gracie | 365/127 |
| 3,988,064 | 10/1976 | Sone et al. | 355/41 |
| 4,082,446 | 4/1978 | Driscoll et al. | 355/27 |
| 4,296,438 | 10/1981 | Stemme et al. | 358/214 |
| 4,367,033 | 1/1983 | Watanabe | 355/5 |
| 4,589,767 | 5/1986 | Yanagi et al. | 355/45 |
| 4,729,015 | 3/1988 | Wagensonner | 358/76 |
| 4,755,869 | 7/1988 | Tanaka | 358/60 |
| 4,857,965 | 8/1989 | Ishii et al. | 355/45 |
| 4,958,186 | 9/1990 | Sashida | 355/45 |
| 4,963,923 | 10/1990 | Kusano et al. | 355/45 |

FOREIGN PATENT DOCUMENTS 2235354 7/1971 Fed. Rep. of Germany.

OTHER PUBLICATIONS

Japanese Patent Abstract vol. 8, No. 282 (P-323) (1719), Dec. 22, 1984.

Primary Examiner—Victor R. Kostak
Assistant Examiner—Wendy R. Greening
Attorney, Agent, or Firm—Gary L. Griswold; Walter N. Kirn; Walter C. Linder

[57] ABSTRACT

A film image reader/scanner apparatus providing two capabilities, operable at separate times wherein one capability provides for the projection onto a viewing screen of a light image created from a film image presented to the apparatus with the second capability providing for a line-by-line scan of the light image that is directed to a linear scan array for the production of signals representative of the light image.

10 Claims, 1 Drawing Sheet

APPARATUS OPERABLE AS A VIEWER OR IMAGE SCANNER

This is a continuation of application Ser. No. 07/202,371 filed June 6, 1988 now abandoned.

TECHNICAL FIELD

The invention presented herein relates to an apparatus having two capabilities which are operable at separate times; one provides for the projection on a viewing screen of a light image created from a film image and the other provides for scanning of the light image for the creation of signals representative of the light image.

BACKGROUND ART

Apparatus having two capabilities, operable at separate times, wherein one of the capabilities provides for the projection of a light image created from a film image to a viewing screen are well known. The apparatus disclosed in U.S. Pat. No. 3,988,064 to Sone et al; U.S. Pat. No. 4,367,033 to Watanabe; and U.S. Pat. No. 4,589,767 to Yanagi et al are representative of such apparatus. The other capability provided by such prior art apparatus is that of providing a latent image of the image carried on a film at a photosensitive medium presented on a rotating drum from which a print of the latent image can be made using various well known electrophotographic development process mechanisms.

Such prior art arrangements are desirable when an operator needs a print of the image being viewed at the time the operator is viewing the image on a viewing screen. If the print is actually wanted at another location, the print must be made and then physically taken to such location. Further, while the prior art apparatus enables the operator to observe an image carried by a film on the viewing screen, if a print of an observed image is desired at some later time, the imaged film must be retrieved and the image located. Further, the quality of the print obtained by directing the imaged film at the viewing screen to a photosensitive medium is limited by the quality of the image.

SUMMARY OF THE INVENTION

The invention presented herein provides an apparatus which has two capabilities which are operable at separate times, wherein one of the capabilities, as with the prior art apparatus, provides for the projection of an image carried by a film to a viewing screen. The second capability provides for presentment of the image carried on the film to a linear scan array on a line-by-line basis wherein the linear scan array encompasses the full line width of the image. The linear scan array is a type that is operative to produce signals representative of the image presented to it which can be digitized. An apparatus with such capabilities provides digital signals representative of the image that can be directed to a printer provided as a part of or adjacent to the apparatus or at a point remote from the apparatus to provide a print of the scanned image. Further, by providing the image in the form of digital signals, as indicated, it is possible to store the image in the form of such digital signals for recall at a later time for use in producing a print of the digitally stored image or for presentment of the digitally stored image on a CRT monitor or other visible image producing devices using a digital signal input.

In addition to the structure for the first capability providing for the projection onto a viewing screen of a light image created from a film image, which is known in the prior art, the apparatus includes the mentioned linear scan array plug means positionable with respect to the light path provided for the image projection capability for progressive presentment of the light image to the linear scan array so the linear scan array receives the full dimension of the image along a line in one direction whereby the apparatus provides signals obtained from a line-by-line scan of the light image. The linear scan array can be provided by a charge coupled device (CCD) or photodiode array.

In one embodiment of the invention the means positionable with respect to the light path provided for the image projection capability for progressive presentment of the light image to the linear scan array includes a mirror operable for movement about an axis of rotation. Such a mirror can be provided by an oscillating or rotating mirror structure.

In another embodiment of the invention the means positionable with respect to the light path provided for the image projection capability for progressive presentment of the light image to the linear scan array includes a mirror that is movable away from the light path with the linear scan array being movable relative to the light image directed to the linear scan array.

BRIEF DESCRIPTION OF THE DRAWING

Other features, advantages and aspects of the invention presented herein will become readily apparent to those skilled in the art upon consideration of the following detailed description which is given in reference to the drawing wherein.

DETAILED DESCRIPTION

Figure 1:
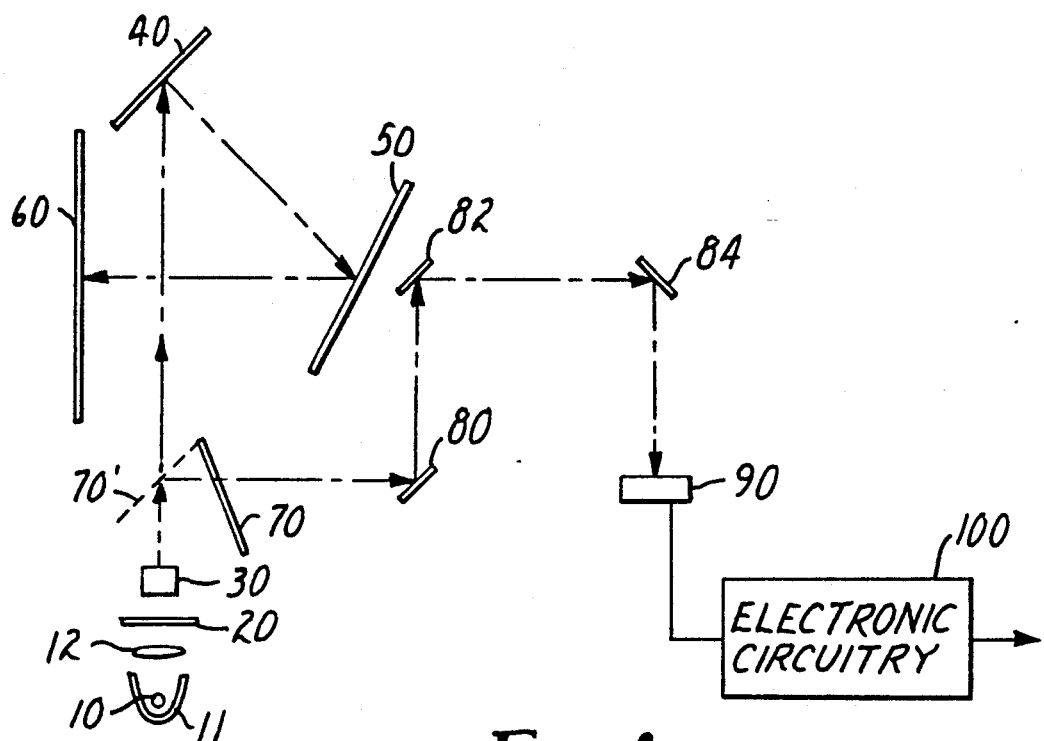
FIG. 1 is a schematic showing of one embodiment of the invention.

Referring to FIG. 1 of the drawing, an apparatus embodying the invention presented herein as shown in schematic form. The apparatus includes a light source 10 which has its output directed by a reflector 11 and a condensing lens 12 to a film plane indicated by the line 20 at which an image carried on a film can be presented. One function of the apparatus allows the operator to view an image when an image carried by a film is presented to the apparatus. The image on the film is enlarged and is projected onto a viewing screen 60 that is a part of the apparatus. The film presented to the apparatus can take on various forms that are well known such as microfilm, microfiche and film aperture cards. In addition to the viewing screen 60, the apparatus includes an enlarging lens 30 plus two first surface mirrors 40 and 50 for folding the optical path before being presented to the viewing screen 60 which is of the type that permits the image to be viewed from the side opposite from the side to which the light image is directed. The light image provided by a film at the film plane 20 is enlarged by lens 30 for passage to the mirror 40 where it is then directed to mirror 50 for reflection to the viewing screen 60. The light path provided by the components described allows the operator to view the light image projected onto the viewing screen 60 when an image carrying film is presented at the film plane 20 and the light source 10 is energized.

The function of the apparatus described to this point is known and is incorporated in various film readers and film reader-printer apparatus that are currently available.

Additional components are provided in the apparatus of FIG. 1 for carrying a second capability or function which provides for the production of signals based on the light image that is presented in a progressive line by line manner to a linear scan array 90 that is provided. The other additional components provided for this second function include first surface mirrors 70, 80, 82 and 84. Mirror 70 has two positions with the dotted line referenced by the numeral 70' showing the position to which it is moved when the second capability is to be provided. The other position for mirror 70 takes it out of the light path allowing the apparatus to be operated to provided the first reader or viewing capability that has been described. The mirror 70 is movable about an axis of rotation when in the position shown by dotted line 70' in FIG. 1. The light image is progressively presented to the linear scan array 90 via the mirrors 80, 82 and 84 as the mirror 70 moves about its axis of rotation. The mirror 70 can be an oscillating or rotating mirror. As a rotating mirror it can take the form of a polygon mirror wherein a number of mirrors are positioned for rotation about its axis or it can be a single mirror or double-sided mirror, each mirror surface, when presented to the light image, serving to progressively present the light image to the linear scan array.

As with mirrors 40 and 50, mirrors 80, 82 and 84 merely serve to fold the light path allowing the housing (not shown) for the apparatus to be compact in size. With mirror 70 and its 70' position, the light image is received from the enlarging lens 30 and is directed to mirror 80 where it is reflected for passage to mirror 82 and thence to mirror 84 where it is directed to the linear scan array 90. The block 100 represents the electronic circuitry connected to the array 90 to receive the output signals from the array when it is receiving the light image and provide such signals in digitized form to other apparatus, such as a printer, a signal storage device, computer or an electronic display device.

As can be seen from FIG. 1, only the light source 10, reflector 11, lens 12, film plane 20 and enlarging lens 30 are components that are common to the two capabilities or functions provided by the apparatus. A second embodiment of the invention is shown in schematic form in FIG. 2 wherein more common parts are used and fewer additional components are used to provide the two functions that have been described. As in the case of the apparatus of FIG. 1, one of the components of the apparatus of FIG. 2 has two positions, one position establishing the configuration for one of the two functions and the second position establishing the configuration for the other function.

Figure 2:
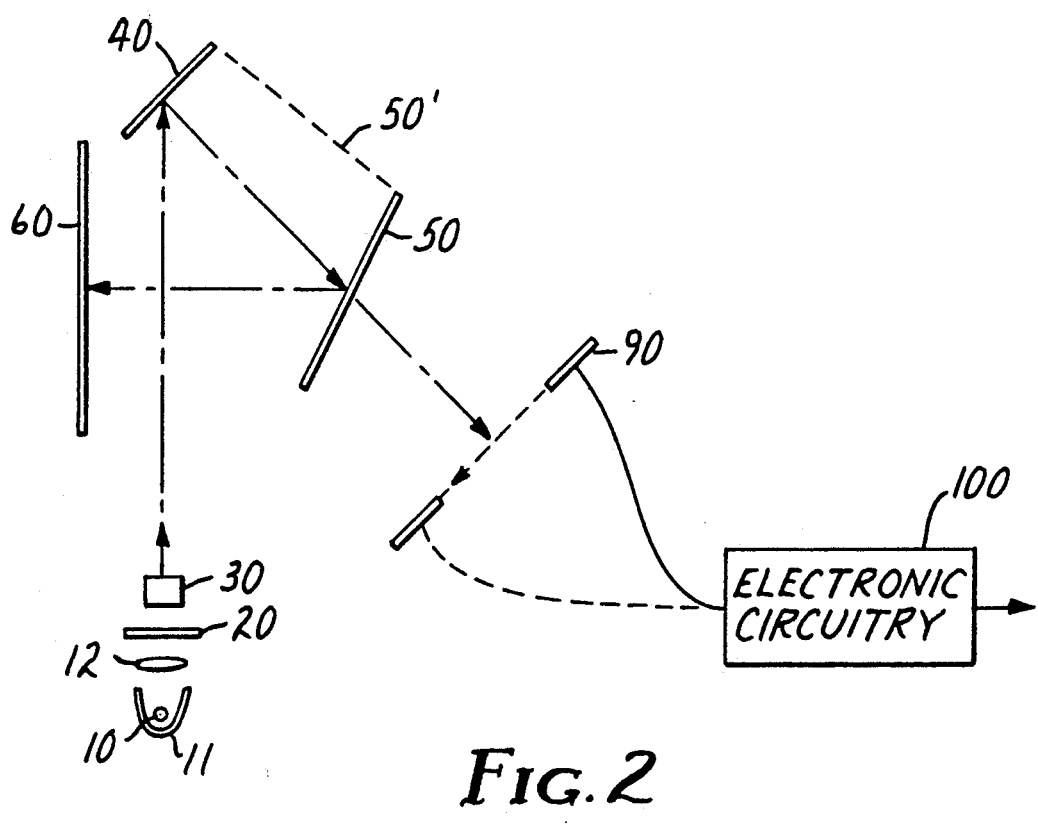
FIG. 2 is a schematic showing of a second embodiment of the invention.
Figure 1:
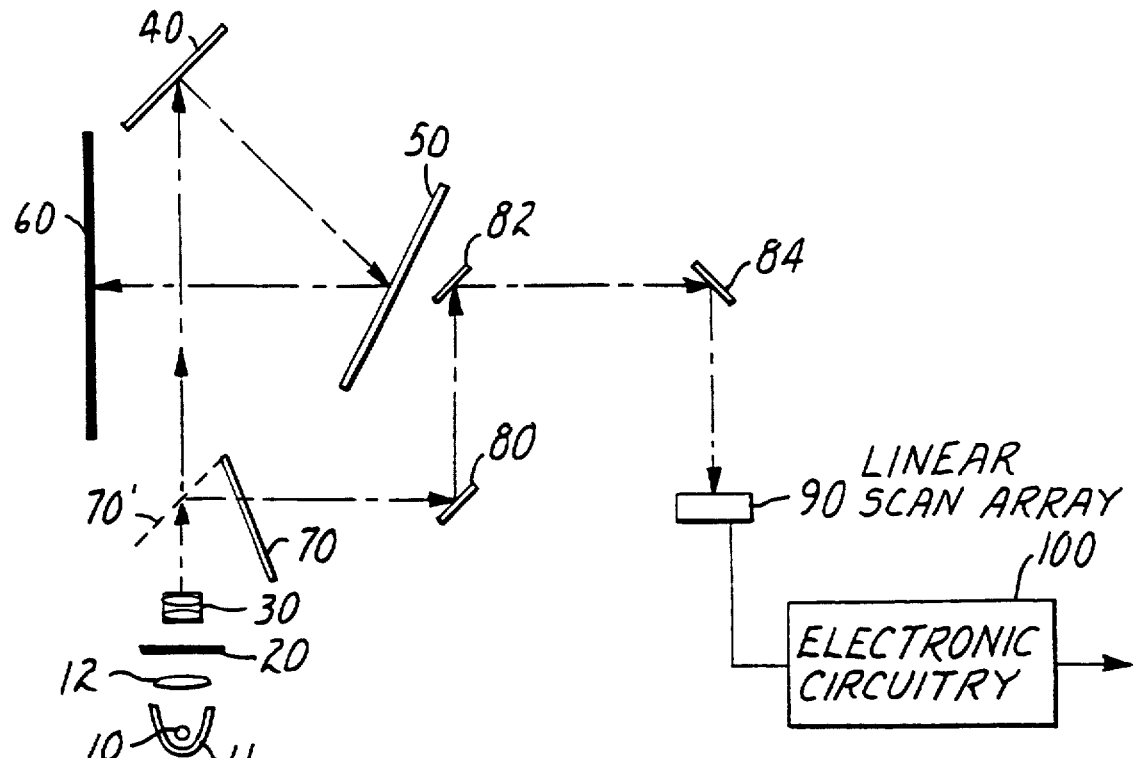
Figure 2:
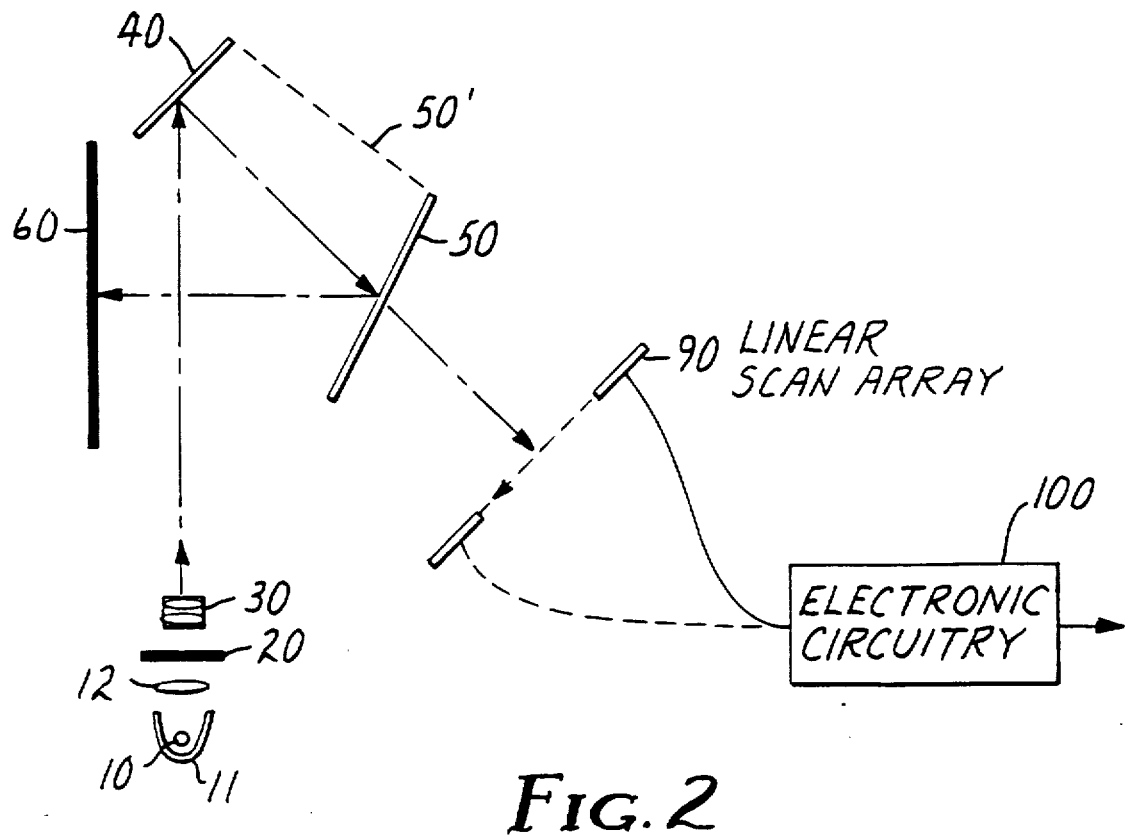

Referring to FIG. 2, the apparatus for providing the reader of viewing function has the same components as are employed by the apparatus of FIG. 1, except that mirror 50 has two positions. The dotted line 50' shows the position for mirror 50 when the second function is provided for producing signals representative of the image. Thus, like the apparatus of FIG. 1, the apparatus of FIG. 2 has a light source 10, reflector 11, condensing lens 12, film plane 20, enlarging lens 30, viewing screen 60 and first surface mirrors 40 and 50 which operate to provide the first function as described for the apparatus of FIG. 1.

While the apparatus of FIG. 2 has a linear scan array 90, it differs from FIG. 1 in that the array 90 is arranged for movement so that it traverses the light image to provide for the progressive presentment of the light image to the array 90 required for the second function. The light image for the second function is directed for interception by the array 90 during its movement by placing mirror 50 at its position indicated by the dotted line 50'. The light image from enlarging lens 30 thus passes to mirror 40 where it is then directed to the path traversed by the array 90. The apparatus of FIG. 2 also employs the electronics 100 which connect to the array 90 for receiving the signals produced by the array 90 for digitizing the image detected by the array 90 on a line-by-line basis as the image is progressively presented to the array 90 and presenting such signals to other apparatus as indicated in connection with FIG. 1.

The linear scan array 90 for the apparatus of FIGS. 1 and 2 can be provided by a charge coupled device (CCD) or photodiode array which are commercially available. The density of the elements the resolution of the digitized image along each line that is digitized. The resolution in the other direction is determined by the spacing provided between each digitized line which can be controlled by the rate at which the light image is progressively presented to the array 90.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this specification.

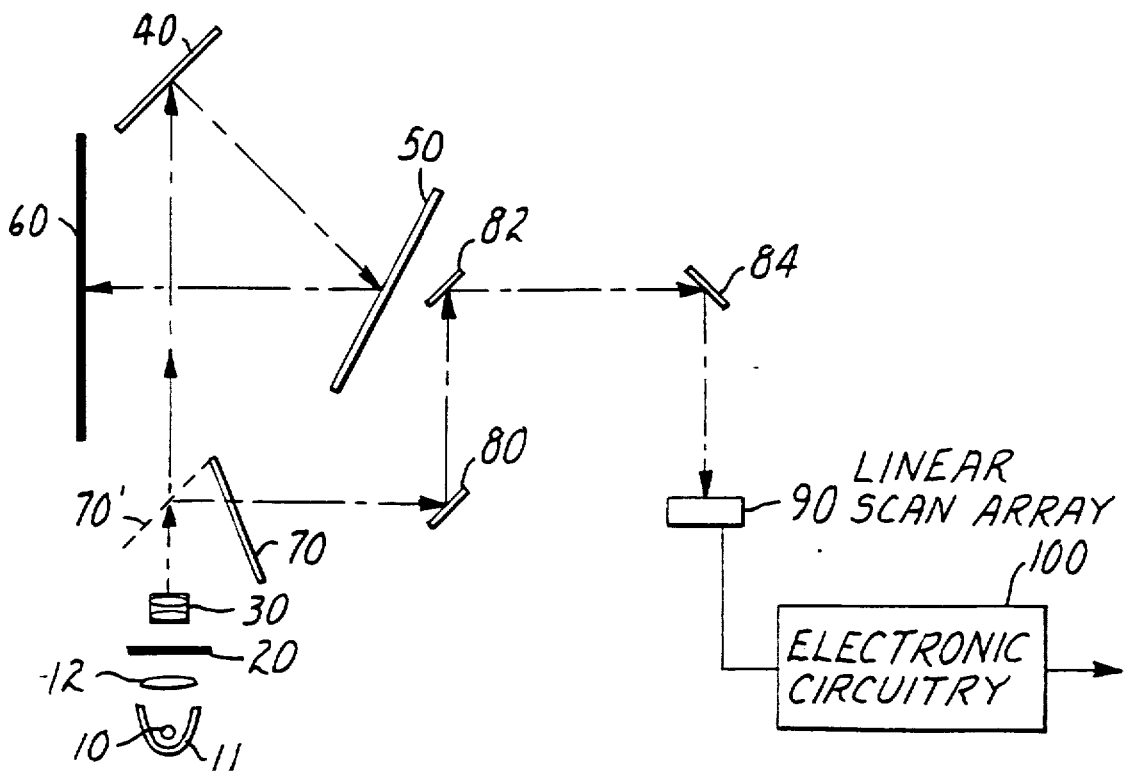

I claim:

1. Apparatus having two capabilities operable at separate times wherein one of the capabilities is a light image projection capability that provides for projection to a viewing screen via a light path for light image created from an image carried on a film when presented to the apparatus, the apparatus including a linear scan array operable to produce signals representative of a light image presented to it; and light directing means positionable with respect to the light path provided for the light image projection capability for progressive presentment of the light image to said linear scan array so said linear scan array receives the full dimension of the light image along a line in one direction whereby the second capability of the apparatus provides for the creation of digital image reproduction data on a line-by-line basis and representative of the image carried on a film when presented to the apparatus, and for the storage of the digital data representative of the light image so the image can be reproduced from the data.

2. The apparatus according to claim 1 wherein said light directing means includes a mirror operable for movement about an axis of rotation.

3. The apparatus according to claim 1 wherein said linear scan array is provided by a series of linearly positioned charge coupled devices or photodiodes.

4. The reader/scanner of claim 1 and further including an image device for producing a visual representation of the two-dimensional image as a function of the digital image production data.

5. A film reader/scanner, including:
film receiving means for receiving film bearing a two-dimensional image;
a lamp for illuminating the film to produce a light image of the image on the film;
a visual projection screen for providing a visual display of the light image;

an optical sensor for receiving and producing signals representative of the light image;

a reader mode optical path for propagating the light image from the film to the visual projection screen;

a scanner mode optical path for propagating the light image from the film to the optical sensor;

mode selection optics for selectively causing the reader/scanner to operate in either a reader mode or a scanner mode, the mode selection optics causing the light image to be propagated about the reader mode optical path when operated in the reader mode, and causing the light image to be propagated about the scanner mode optical path when operated in the scanning mode;

circuitry coupled to the optical sensor for generating digital image reproduction data representative of the two-dimensional light image; and electronic storage for storing the digial image reproduction data for subsequent reproduction of the image.

6. The reader/scanner of claim 4 wherein:

the optical scanner includes a linear optical sensor for receiving and producing signals representative of a one-dimensional portion of the light image; and the reader/scanner further includes an image directing mechanism for producing relative motion in a second dimension between the light image and linear sensor to cause progressive presentment of the light image to the linear sensor.

7. The reader/scanner of claim 4 and further including an image device coupled to the electronic storage for producing a visual representation of the two-dimensional image as a function of the digital image reproduction data.

8. The reader/scanner of claim 7 wherein the linear sensor includes a series of linearly positioned charge coupled devices or photodiodes.

9. The film reader/scanner of claim 6 wherein the image directing mechanism includes a mirror figured for a movement about an axis of rotation.

10. The reader/scanner of claim 7 wherein the reader mode optical path and scanner mode optical path include a mirror.

* * * * *

UNITED STATES PATENT AND TRADEMARK OFFICE
CERTIFICATE OF CORRECTION

PATENT NO. : 5,084,756

DATED : January 28, 1992

INVENTOR(S) : Robert A. Muehlhausen

It is certified that error appears in the above-indentified patent and that said Letters Patent is hereby corrected as shown below:

Col. 2, Line 41, "as" should read -- is --.

Col. 4, Line 18, "elements the" should read -- elements determine the --.

Col. 4, Line 36, "for" should read -- of the --.

Col. 5, Line 1, "of claim 4" should read -- of claim 5 --.

Col. 6, Line 1, "scanner" should read -- sensor --.

Col. 6, Line 9, "of claim 4" should read -- of claim 5 --.

Col. 6, Line 10, "image" should read -- imaging --.

Col 4, Line 59, "image" should read -- imaging --.

Col 4, Line 61, "production" should read -- reproduction --.

Signed and Sealed this

Eighteenth Day of October, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,084,756
DATED : January 28, 1992
INVENTOR(S) : Robert A. Muehlhausen It is certified that error appears in the above-indentified patent and that said Letters Patent is hereby corrected as shown below:

Col. 6, Claim 8, Line 14, "of claim 7" should read -- of claim 6 --.

Col. 6, Claim 9, Line 14, "of claim 6" should read -- of claim 8 --.

Col. 6, Claim 10, Line 20, "of claim 7" should read -- of claim 9 --.

UNITED STATES PATENT AND TRADEMARK OFFICE
CERTIFICATE OF CORRECTION

PATENT NO. : 5,084,756

DATED : January 28, 1992

INVENTOR(S) : Robert A. Muehlhausen

It is certified that error appears in the above-identified patent and that said Letters Patent is hereby corrected as shown below:

The title page should be deleted to appear as per attached title page.

Drawing sheet 1 consisting of two figures should be deleted to appear as per attached drawing sheet 1 consisting of two figures.

United States Patent [19]

Muehlhausen

[11] Patent Number: 5,084,756
[45] Date of Patent: Jan. 28, 1992

[54] APPARATUS OPERABLE AS A VIEWER OR IMAGE SCANNER

[75] Inventor: Robert A. Muehlhausen, May Township, County of Washington, Minn.

[73] Assignee: Minnesota Mining and Manufacturing Company, St. Paul, Minn.

[21] Appl. No.: 569,587

[22] Filed: Aug. 20, 1990

Related U.S. Application Data

[63] Continuation of Ser. No. 202,371, Jun. 6, 1988, abandoned.

[51] Int. Cl.⁵ .............. H04N 3/36; H04N 5/253; H04N 3/40; H04N 12/28; G03B 13/28
[52] U.S. Cl. .............................. 358/214; 358/215; 355/45
[58] Field of Search .............. 358/214, 215, 60; 365/127; 355/45; 353/66, 82, 122

[56] References Cited

U.S. PATENT DOCUMENTS

| | | | |
|---|---|---|---|
| 3,832,528 | 8/1974 | Abe | 365/127 |
| 3,838,402 | 10/1974 | Gracie | 365/127 |
| 3,988,064 | 10/1976 | Sone et al. | 355/41 |
| 4,082,446 | 4/1978 | Driscoll et al. | 355/27 |
| 4,296,438 | 10/1981 | Stemme et al. | 358/214 |
| 4,367,033 | 1/1983 | Watanabe | 355/5 |
| 4,589,767 | 5/1986 | Yanagi et al. | 355/45 |
| 4,729,015 | 3/1988 | Wagensonner | 358/76 |
| 4,755,869 | 7/1988 | Tanaka | 358/60 |
| 4,857,965 | 8/1989 | Ishii et al. | 355/45 |
| 4,958,186 | 9/1990 | Sashida | 355/45 |
| 4,963,923 | 10/1990 | Kusano et al. | 355/45 |

FOREIGN PATENT DOCUMENTS 2235354  7/1971  Fed. Rep. of Germany .

OTHER PUBLICATIONS

Japanese Patent Abstract vol. 8, No. 282 (P-323) (1719), Dec. 22, 1984.

*Primary Examiner*—Victor R. Kostak
*Assistant Examiner*—Wendy R. Greening
*Attorney, Agent, or Firm*—Gary L. Griswold; Walter N. Kirn; Walter C. Linder

[57] ABSTRACT

A film image reader/scanner apparatus providing two capabilities, operable at separate times wherein one capability provides for the projection onto a viewing screen of a light image created from a film image presented to the apparatus with the second capability providing for a line-by-line scan of the light image that is directed to a linear scan array for the production of signals representative of the light image.

10 Claims, 1 Drawing Sheet